INVENTOR.
HAROLD G. SEER, JR

INVENTOR.
HAROLD G. SEER, JR.
BY
ATTORNEY

United States Patent Office 3,373,344
Patented Mar. 12, 1968

3,373,344
VOLTAGE REGULATOR CIRCUIT INCLUDING A STORAGE CAPACITOR AND A SWITCHING MEANS RESPONSIVE TO A VOLTAGE DIFFERENCE FOR CHARGING THE CAPACITOR
Harold G. Seer, Jr., Wilmington, Del., assignor to Radio Corporation of America, a corporation of Delaware
Filed Sept. 14, 1964, Ser. No. 396,075
9 Claims. (Cl. 323—22)

ABSTRACT OF THE DISCLOSURE

An unregulated source supplies current to a capacitor by way of a switching means. The capacitor acts as a current supply for a voltage regulator. Means are provided to turn the switching means off only when the voltage of the source exceeds the voltage of the output of the regulator by more than a critical value.

Figure 1:
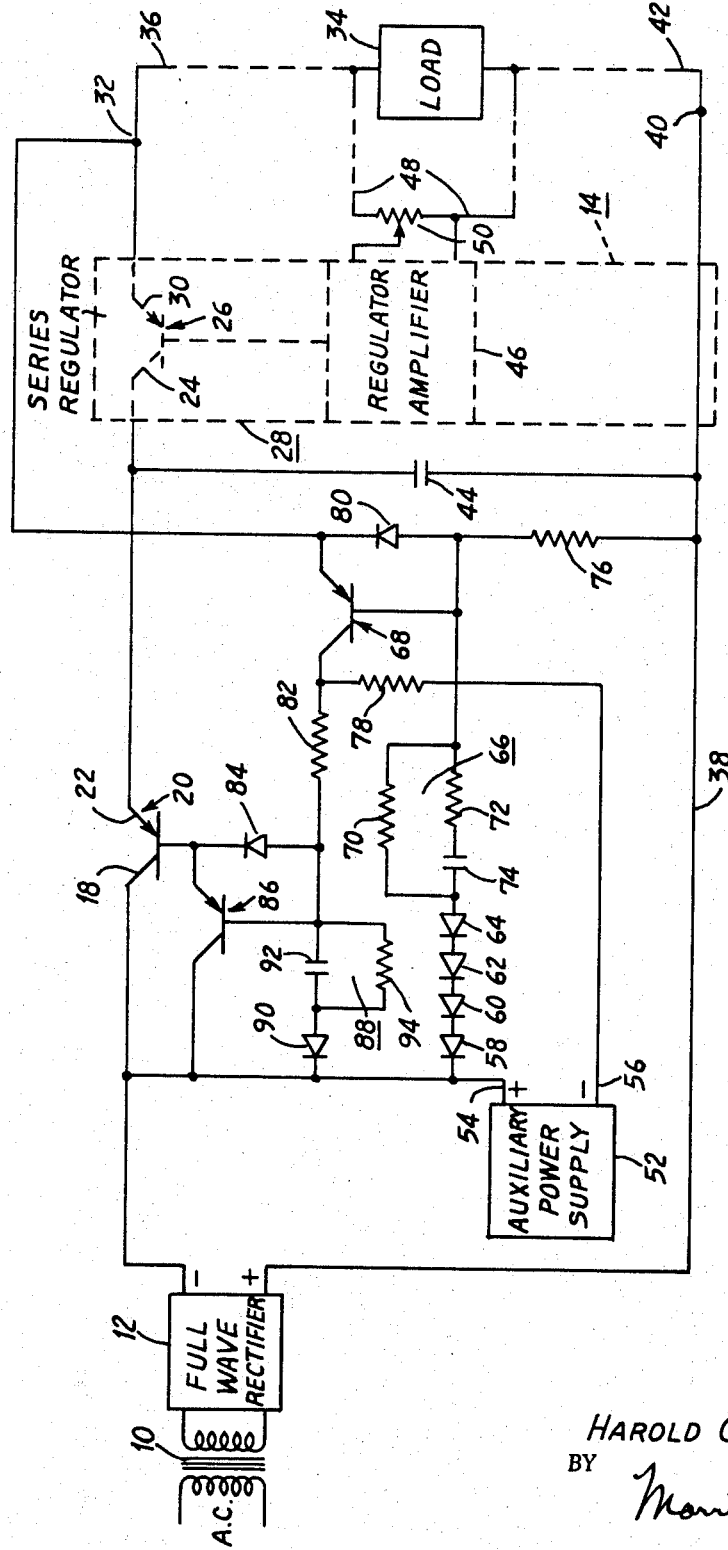

This invention relates to a voltage regulator circuit, and more particularly to a transistorized voltage regulator circuit.

In the normal operation of the regulator for keeping the output voltage thereof constant, the voltage drop across the series connected regulating transistor rises when the supply voltage rises. The power dissipated in the series transistor, which is the product of the voltage thereacross and the current therethrough, also rises, whereby the transistor is heated. A blower or a heat sink or both may be provided to dissipate the heat developed in the series regulating transistor. To prevent damage to this transistor, its heat sink or blower is designed to dissipate enough heat to keep the transistor temperature at a safe level. Furthermore, the watt rating of the series transistor should be such that it can safely dissipate the greatest amount of heat that is likely to develop therein.

It is an object of this invention to provide an improved transistorized voltage regulator of the type set forth wherein the series regulating transistor is safeguarded against overheating.

It is a further object of this invention to provide a transistorized voltage regulator including means for reducing the voltage drop across the series regulating transistor thereof.

It is still a further object of this invention to provide a transistorized voltage regulator in which the series regulating transistor may have a smaller watt rating, and in which a smaller heat sink or blower is used than is necessary in presently known regulators of like current capacity.

It is still another object of this invention to provide a transistorized voltage regulator in which no blower or only a small blower and only a small heat sink, or no heat sink or blower at all, may be necessary to keep the temperature of the series regulating transistor at a safe level.

According to this investigation, a switching transistor is provided so connected in circuit with the filter or storage capacitor of the voltage regulator that the charging current for the storage capacitor passes through the switching transistor, the output of the regulator being taken from the storage capacitor through the regulating transistor. Means are provided for sensing the difference in voltage across the source (which may be a rectifier) and across the output terminals of the regulator and for rendering the switching transistor conductive and non-conductive over such switching angles that a predetermined substantially constant difference is maintained between the voltages across the capacitor and across the output terminals, substantially independent of the voltage of the source and of the output voltage of the rectifier. Thus, the voltage drop across the regulating transistor and the heating thereof are substantially constant and substantially independent of the voltage supply or the output voltage. Since the losses in the regulating transistor are substantially constant, a transistor (and heat sink and blower, if necessary) may be chosen for any particular, substantially constant load and the transistor and cooling means therefor, if any, need not be large enough to withstand a greater, occasional load, as in prior art devices. Also, since the maximum voltage drop across the regulating transistor may be kept smaller than in prior art regulators, an inexpensive, low voltage, germanium transistor may often be used as the regulating transistor, rather than a more expensive, higher voltage, silicon transistor. This results in lower cost and higher efficiency of the regulator. Furthermore, since the switching transistor is either saturated, at which time its resistance is at a minimum value, or the transistor is blocked, when the current flowing therethrough is substantially zero, the power dissipated in the switching transistor is low and the watt rating of the switching transistor may be low.

Figure 2:
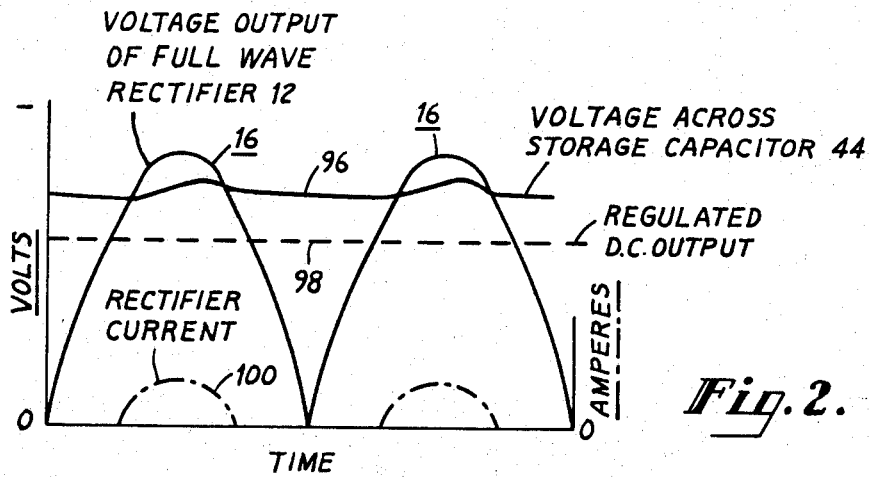
Figure 3:
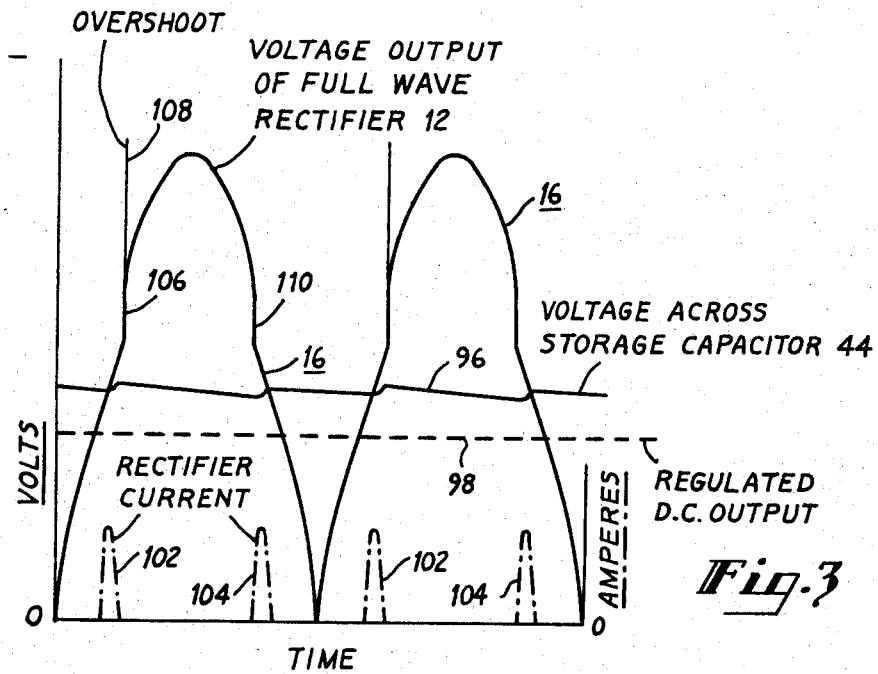

The novel features of this invention, both as to its organization and method of operation, as well as additional objects and advantages thereof, will be understood more readily from the following description when read in conjunction with the accompanying drawings, in which:

FIG. 1 is a wiring diagram of a voltage regulator in accordance with this invention, and FIGS. 2 and 3 are curves showing voltages and currents appearing in the circuit of FIG. 1, useful in explaining the operation of the regulator of FIG. 1.

Turning, first, to FIG. 1, alternating current is applied across the primary winding of a transformer 10. A conventional full wave rectifier 12 is connected across the secondary winding of the transformer 10. Unfiltered voltage half-wave pulses 16 (such as is shown in FIGS. 2 and 3) appear across the output terminals of the rectifier 12. The negative terminal of the full-wave rectifier 12 is connected to the collector 18 of a switching transistor 20, the emitter 22 of which is connected to the collector 24 of a series regulating transistor 26, which is part of the regulator 28 indicated by the dotted rectangle 14. The emitter 30 of the regulating transistor 26 is collected to the negative terminal 32 of the regulator 28. This terminal 32 may be connected to a terminal of a load 34 by a lead 36. The lead 36 may be a long one, as indicated by the dash line portion thereof. The positive terminal of the rectifier 12 is connected through a positive bus line 38 to the positive terminal 40 of the regulator 28. This positive terminal 40 is itself connected to the other terminal of the load 34 by a further lead 42 which may also be a long one. A storage capacitor 44 is connected between the collector 24 of the regulating transistor 26 and the positive bus line 38. Since a large, variable, current may flow in the long leads 36 and 42, the voltage across the output terminal 32 and 40 of the voltage regulator 28 may not be a true measure of the voltage applied across the load 34 due to the voltage drop in the leads 36 and 42. Therefore, the voltage applied to a regulating amplifier 46, which comprises a known element of the voltage regulator 28, is taken from across the terminals of the load 34 by separate regulator leads 48. Since the current in the regulator leads 48 (which are also long and are therefore also shown by dash lines) is very small, the voltage applied thereby to the regulator amplifier 46 will be a true measure of the voltage appearing across the load 34. A potentiometer 50 may be provided to control the voltage applied to the regulating amplifier 46, and therefore to control the voltage applied by the regulator 28 to the load 34. In a known manner, the current fed to the base of the regulating transistor 26 by the regulator amplifier 46 will be such as to keep the voltage across the load 34 at the desired value regardless of the voltage drop in the long leads.

If the negative terminal of the rectifier 12 were connected directly to the collector 24 of the regulating transistor 26, then the voltage across the storage capacitor 44 would rise in response to an increase in voltage between the positive and negative output terminal of the rectifier 12. Therefore, in keeping the voltage across the load 34 constant at its set value, the regulating transistor 26 would have to dissipate more power as the voltage of the rectifier rises or the output potential of the regulator decreases, requiring a large, expensive regulating transistor 26 or a large heat sink or a blower, or all of these, as stated hereinabove. However, means are provided to keep the difference between the voltage across the capacitor 44 and the voltage across the output terminals 32 and 40 substantially constant regardless of any increase in the voltage provided by the rectifier 12. This means includes the switching transistor 20 and further means for switching the transistor 20 between saturation and cut-off in accordance with this voltage difference.

The switching means includes an auxiliary power supply 52. While a self-contained power supply 52 is illustrated, this power supply 52 may be a full wave rectifier or a voltage doubler. The power supply 52 may be fed from an additional winding (not shown) on the transformer 10. The output of the power supply 52 appearing across its output terminal 54 and 56 may be a filtered direct voltage of about twice the R.M.S. value of the voltage half wave pulses 16 appearing across the output terminals of the rectifier 12. The switching means also includes a plurality of series connected diodes 58 to 64, shown illustratively as four in number, all poled to be conductive in the same direction, the cathode of the first diode 58 being connected to the collector 18 of the switching transistor 20 and to the positive terminal 54 of the supply 52. The anode of the last of these series diodes 64 is connected through an RC circuit 66 to the base of a third transistor 68. The RC circuit 66 comprises two branches in parallel, one of said branches being a resistor 70 and the other of said branches being the series connection of a second resistor 72 and a capacitor 74. The base of the third transistor 68 is connected to the positive bus line through a third resistor 76. The negative terminal 56 of the supply 52 is connected to the collector or the third transistor 68 through a fourth resistor 78. The emitter of the third transistor 68 is connected to the cathode of a diode 80, the anode of which is connected to the base of the transistor 68. The emitter of the transistor 68 is also connected to the negative output terminals 32 of the regulator 28. The collector of the transistor 68 is connected through a fifth resistor 82 to the anode of a diode 84 whose cathode is connected to the base of the switching transistor 20. The anode of the diode 84 is also connected to a base of a fourth transistor 86 and, through a second RC circuit 88, to the anode of a diode 90 whose cathode is connected to the collector 18 of the switching transistor 20. The second RC circuit 88 comprises a third capacitor 92 and a sixth resistor 94 in parallel. The collector of the fourth transistor 86 is connected to the collector of the switching transistor 20.

In the circuit described above, when the difference in the voltage (FIG. 2) across the source 12 and the voltage 98 across the output terminal 32 and 40 is less than a critical voltage, then the switching transistor 20 is saturated, as will be explained below, and acts substantially as if the collector 18 and emitter 22 were connected together. At that time, charging current 100 flows to the capacitor 44 and the capacitor 44 is charged from the rectifier output half wave pulses 16, whenever the voltage of the pulses 16 is high enough. As shown by the slope of the voltage curve 96 (FIG. 3), the capacitor 44 continues to decrease in voltage (when not being charged) since it feeds the load 34. Also, as will be explained in more detail, when the voltage difference exceeds a critical value, the switching transistor 20 is blocked, whereby the capacitor 44 is charged only during those periods when the voltage of the half wave pulses 16 is great enough to charge the capacitor 44 and yet less than the sum of the output voltage 98 and the aforesaid critical voltage. This is indicated in FIG. 3 in which charging pulses of current 102 and 104 exist during portions of the duration of the rectifier output pulses 16 but do not exist during the peaks of the rectifier output pulses. The difference between the voltages indicated by the lines 96 and 98 is substantially the same in FIGS. 2 and 3 even though the voltages of the rectifier pulses 16 is much greater in FIG. 3 than in FIG. 2.

As noted above, the switching transistor 20 is saturated when the difference between the voltage across the source 12 and the voltage ouput of the regulator is less than a critical value. This critical voltage value is the voltage necessary to force current through the path from output terminal 32 of the voltage regulator, through the internal emitter-to-base path of the transistor 68, through the resistor 70 and through the four diodes 58 to 64 in series in their forward direction. This critical voltage may be adjusted by changing the number of type of diodes 58 to 64. The diodes used herein have current thresholds of about one-half volt each in their forward direction, whereby the critical voltage in the circuit illustrated is a little over two volts. When there is no current flowing through this circuit including the diodes 58 to 64, the transistor 68 is blocked by the negative voltage applied to the emitter of this transistor 68 relative to its base from the terminal 32 to the bus line 38 through resistor 76. The diode 80, whose voltage drop in a forward direction of current thereto is about a half a volt, limits the voltage between the emitter and the base of transistor 68 to a safe value. When the transistor 68 is blocked, current from the auxiliary supply 52 takes the path from the terminal 56 through resistor 78, resistor 82, base of the transistor 86, emitter of this transistor 86, base of transistor 20, through emitter 22 and the series regulator transistor 26, through the load 34, through the rectifier 12 and back to the positive terminal 54 of the auxiliary supply 52. This current flow saturates the transistors 86 and 20, and the circuit operates in accordance with FIG. 2, as described above.

When the difference between the voltage across the source 12 and the voltage across the output terminal 32 and 40 exceeds the critical voltage, current flows in the circuit comprising terminal 32, the internal emitter-to-base path of the transistor 68, through the resistor 70 and the four diodes 58 to 64 in series. Transistor 68 is saturated, and current from the supply 52 now flows along a path from the negative terminal 56 of the supply 52, the resistor 78, the collector of the transistor 68, the base of the transistor 68, the resistor 70, diodes 58 to 64 and back to the positive terminal 54 of the supply 52. The voltage of the collector of the saturated transistor 68 becomes about equal to the voltage of the emitter thereof, since, when saturated, the transistor 68 has very little voltage drop therein. This collector voltage of transistor 68 is applied to the base of the transistor 86 to block it. Blocking of transistor 86 increases the impedance between the emitter and base of the transistor 86, which is connected across the diode 84, to a high value, whereby the voltage at the collector of the transistor 68 is applied through diode 84 to the base of the transistor 20 to block that transistor. Therefore, when the difference in voltage between the collector 18 of the transistor 20 and at the terminals 32 is higher than the critical voltage value, at which time the diodes 58 to 64 are conductive, the switching transistor 20 is blocked or switched off, preventing further charging of the capacitor 44. The resultant operation of the circuit will be explained in connection with FIG. 3.

When the voltage pulses become great enough to charge the capacitor 44, charging current 102 begins to flow. When the switching transistor 20 is suddenly blocked as explained above, current from the rectifier 12 is blocked and the charging of capacitor 44 ceases. Due to the sudden cessation of current flow in the circuit of the rectifier 12, its voltage output increases suddenly, as indicated by the substantially vertical portion 106 of the curve 16 in FIG. 3. Also, due to the sudden cessation of current flow, an overshoot voltage, as illustrated by the spike 108, occurs in the rectifier circuit due to the inductance of the transformer 10.

No charging current will flow in the rectifier 12 circuit until the voltage of each pulse 16 drops to a value equal to that of the regulator output voltage plus that of a critical voltage. However, when charging current 104 starts flowing in the rectifier 12 circuit, the voltage of the pulse 16 drops still further, as indicated by the substantially vertical portion 110 of the curve 16. Since the pulse is in the decreasing amplitude portion of the cycle, the voltage of the pulse 16 may decrease to the point where substantially no current 104 would flow as soon as the voltage of the pulse 16 becomes less than the critical voltage plus the regulator output voltage. To insure flow of charging current during the voltage decreasing portion of the cycle of pulse 16, the RC circuit 66 is provided in series with the several diodes 58 to 64. The capacitor 74 in this RC circuit 66 charges when current is flowing through the diodes 58 to 64, that is, during the portion of the pulse 16 when the switching transistor 20 is blocked and no charging current flows to capacitor 44. The voltage built up in this capacitor 74 is in a direction such as to subtract from the voltage applied across the diodes, whereby the critical voltage is increased, and whereby the flow of diode circuit ceases at a higher voltage of pulse 16 than if the RC circuit 66 were absent, in the decreasing voltage portion of the cycle of the pulse 16. This RC circuit 66 therefore increase the critical voltage, at which the diode current ceases, during the decreasing amplitude portion of the voltage pulse 16. When current ceases to flow through the diodes 58 to 64, the switching transistor 20 is suddenly saturated and charging current, illustrated by the pulse 104 in FIG. 3, flows into capacitor 44. However, as soon as the current flows in the rectifier circuit, the voltage of the pulse 16 drops, as indicated by the portion 110 of the pulse 16. When the voltage pulse 16 decreases in value to a point where it cannot charge the capacitor 44, the charging current 104 ceases. Therefore, as shown in FIG. 3, two pulses of charging current 102 and 104 occur during each half-wave of the rectifier voltage 16 when the voltage of the rectifier pulse 16 goes high enough.

An overshoot voltage 108 appears due to the inductance of the transformer 10 in the circuit of the rectifier 12 whenever current suddenly ceases to flow in the rectifier circuit. This overshoot voltage 108 may be great enough to harm the regulator circuit. To prevent this overshoot voltage from building up to a harmful level, the second RC circuit 88 is provided as described above. The current for blocking the fourth transistor 86 and the switching transistor 20 flows into the capacitor 92 of the second RC circuit 88, and therefore the voltage across this capacitor gradually builds up during a period depending on the time constant of this RC circuit 88. Thus, the blocking of transistors 86 and 20 is sufficiently slowed down to keep the overshoot voltage 108 down to a harmless level. The diode 90 is provided to prevent slowing down of the time it takes to switch the switching transistor 20 on, so that the transistor 20 will go on during the decreasing portion of the voltage pulse 16 while the pulse 16 is still above charging voltage value.

Although only a single voltage regulating circuit has been described, it will undoubtedly be apparent to those skilled in the art that variations are possible within the spirit of the invention. For example, if the Beta of the switching transistor 20 is sufficiently high, no fourth transistor 86 need be provided. Similarly, three of the four diodes 58 to 64 may be replaced by a Zener diode, the fourth diode being retained to determine the direction of current flow, the Zener diode and fourth diode providing the required voltage threshold. The positive terminal of the supply 52 may be connected to the emitter 18 of the transistor 20 instead of to the collector thereof, as shown. NPN transistors may be used in the described voltage regulator circuit with appropriate changes in circuitry, instead of the PNP transistors shown. It should therefore be understood that the foregoing description is to be considered as illustrative and not in a limiting sense.

What is claimed is:

1. In a voltage regulator circuit for developing a regulated D-C voltage from a source and including a storage capacitor and a regulating transistor connected between said capacitor and load terminals, the improvement comprising
    (a) a switching transistor connected between said source and said capacitor,
    (b) a sensing circuit connected between said terminals and said source and responsive to the difference in voltages across said load terminals and across said source,
    (c) said sensing circuit being connected to said switching transistor to saturate said switching transistor for intervals when said sensed voltage difference decreases below a desired threshold level, and to cut off said switching transistor for intervals when said sensed voltage difference exceeds a desired threshold level.

2. In a voltage regulator including a storage capacitor and a regulating transistor so connected in circuit with a pair of output terminals between which a load may be connected that current from said storage capacitor may flow to said terminals and a voltage source for said voltage regulator connected to supply charging current to said capacitor, means for maintaining the difference in the voltage across said capacitor and the voltage across said load at less than a critical value comprising
    (a) a switching transistor in series with said voltage source and said storage capacitor,
    (b) means for maintaining said switching transistor normally in a conductive condition,
    (c) means for sensing the difference in voltages across said source and across said output terminals, and
    (d) means responsive to said last-mentioned voltage difference when it has exceeded said critical value to switch said switching transistor to a non-conductive condition.

3. In a voltage regulator including a storage capacitor and a regulating transistor so connected in circuit with a pair of output terminals between which a load may be connected that current from said capacitor may flow to said terminals and a voltage source for said regulator connected to supply charging current to said capacitor, means for keeping the difference in the voltage across said capacitor and the voltage across said load less than a critical value comprising
    (a) a switching transistor in said connection of said voltage source with said storage capacitor,
    (b) means for maintaining said switching transistor in a normally conductive condition,
    (c) a circuit having a voltage threshold of current flow therethrough of substantially said critical value connected between one of said output terminals and a terminal of said voltage source, and
    (d) means responsive to current flow through said threshold circuit for switching said switching transistor to a non-conductive condition.

4. In a voltage regulator, the combination of
(a) a pair of input terminals between which a variable voltage may be applied,
(b) a pair of output terminals between which a load may be connected,
(c) one of said input terminals being connected to one of said output terminals,
(d) a switching transistor and a regulating transistor each having a control electrode and at least two additional electrodes,
(e) one of said additional electrodes of said switching transistor being connected to the other input terminal and the other of said additional electrodes of said switching transistor being connected to one of said additional electrodes of said regulating transistor,
(f) the other of said additional electrodes of said regulating transistor being connected to the remaining one of said output terminals,
(g) means responsive to the voltage across said load to apply a control current to the control electrode of said regulating transistor to vary the impedance between said additional electrodes thereof,
(h) means for normally applying a control current to the control electrode of said switching transistor to maintain it conductive, and
(i) means responsive to an increase to a critical value of the difference in voltage applied across said input terminals and the voltage applied across said output terminals to apply potential to the control electrode of said switching transistor to render it non-conductive.

5. In a voltage regulator apparatus
(a) a storage capacitor,
(b) means connected in circuit with said capacitor to apply a regulated voltage to a load circuit,
(c) a variable voltage supply means for supplying charging current to said storage capacitor,
(d) means for comparing the voltage of said voltage supply means and said regulated voltage and means responsive to said comparing means for causing cessation of charging of said storage capacitor in response to said supply voltage exceeding said regulated voltage by a critical amount.

6. In a voltage regulating apparatus
(a) a storage capacitor,
(b) means connected in circuit with said storage capacitor to apply a regulated voltage to a load circuit,
(c) a variable voltage supply means for supplying charging current to said storage capacitor,
(d) a circuit including at least one diode having a voltage threshold of current flow therethrough in a forward direction connected between a point on said load circuit and said voltage supply, and
(e) means responsive to current flow in said threshold circuit to cause cessation of charging of said storage capacitor by said voltage supply means.

7. In a voltage regulating apparatus
(a) a storage capacitor,
(b) means connected in circuit with said storage capacitor to apply a regulated voltage to a load circuit,
(c) a variable voltage supply means for supplying charging current to said storage capacitor, said variable voltage supply means including a transistor having a control electrode and a pair of additional electrodes, said additional electrodes being connected, respectively, to said voltage supply means and to said storage capacitor,
(d) an auxiliary power supply connected to apply current to said control electrode in a direction to saturate said transistor, and
(e) threshold means connected between said load circuit and said variable voltage supply to shunt said current from said auxiliary power supply away from said control electrode and to apply blocking potential to said control electrode.

8. In a voltage regulating apparatus
(a) a storage capacitor,
(b) means connected in circuit with said storage capacitor to apply a regulated voltage to a load circuit,
(c) a voltage supply means including a variable voltage supply for supplying charging current to said storage capacitor, said variable voltage supply means including a transistor having a control electrode and a pair of additional electrodes, said additional electrodes being connected, respectively, to said voltage supply and to said storage capacitor,
(d) an auxiliary power supply connected to apply current to said control electrode in a direction to saturate said transistor,
(e) a circuit including at least one diode having a voltage threshold of current flow in a forward direction connected between a point in said load circuit and said additional electrode which is connected to said power supply, and
(f) means including said diode circuit for shunting the current from said auxiliary supply away from said control electrode and for applying blocking potential to said control electrode.

9. In a voltage regulating apparatus
(a) a storage capacitor and means connected in circuit with said storage capacitor to apply a regulated voltage to a load circuit,
(b) a power supply of variable voltage pulses having voltage rising and voltage falling portions connected to supply charging current to said storage capacitor, said variable voltage supply connection including a transistor having a control electrode and additional electrodes, said additional electrodes being connected, respectively, to said voltage supply and to said storage capacitor,
(c) an auxiliary power supply connected to supply current to said control electrode in a direction to saturate said transistor,
(d) a circuit including at least one diode having a voltage threshold of current in a forward direction connected between a point in said load circuit and that one of said additional electrodes that is connected to said power supply,
(e) means for shunting the current from said auxiliary power supply away from said control electrode and for applying blocking potential to said control electrode responsive to current flow in said diode circuit, said last named means also removing said blocking potential and supplying said saturated current to said control electrode upon cessation of flow of current in said diode circuit, and
(f) a time constant circuit serially connected in said diode circuit, whereby the voltage of said pulses at which blocking potential is applied to said control electrode is lower during the rising portion of said pulses than the voltage of pulses at which blocking potential is removed from said control electrode during the falling portion of said pulses.

References Cited

UNITED STATES PATENTS 3,219,912 11/1965 Harrison.
3,260,920 7/1966 Shoemaker.
3,267,350 8/1966 Graham et al. _____ 323—9 X

FOREIGN PATENTS 860,061 2/1961 Great Britain.

JOHN F. COUCH, *Primary Examiner.*

A. D. PELLINEN, *Assistant Examiner.*